United States Patent
Patil et al.

(10) Patent No.: US 10,635,606 B2
(45) Date of Patent: Apr. 28, 2020

(54) METHOD AND APPARATUS FOR MAINTAINING CONTINUITY OF ON-GOING SESSION OVER WIRED OR WIRELESS INTERFACE

(71) Applicant: Samsung Electronics Co., Ltd., Gyeonggi-do (KR)

(72) Inventors: Mayuresh Madhukar Patil, Bangalore (IN); Vimal Bastin Edwin Joseph, Bangalore (IN)

(73) Assignee: Samsung Electronics Co., Ltd (KR)

( * ) Notice: Subject to any disclaimer, the term of this patent is extended or adjusted under 35 U.S.C. 154(b) by 8 days.

(21) Appl. No.: 15/774,912

(22) PCT Filed: Nov. 9, 2016

(86) PCT No.: PCT/KR2016/012878
§ 371 (c)(1),
(2) Date: May 9, 2018

(87) PCT Pub. No.: WO2017/082633
PCT Pub. Date: May 18, 2017

(65) Prior Publication Data
US 2018/0322074 A1    Nov. 8, 2018

(30) Foreign Application Priority Data

Nov. 9, 2015  (IN) .......................... 6063/CHE/2015
Nov. 8, 2016  (IN) .......................... 6063/CHE/2015

(51) Int. Cl.
*G06F 13/10* (2006.01)
*G06F 13/42* (2006.01)

(52) U.S. Cl.
CPC ........ *G06F 13/102* (2013.01); *G06F 13/4295* (2013.01); *G06F 2213/0042* (2013.01)

(58) Field of Classification Search
CPC .................................................. G06F 13/4282
See application file for complete search history.

(56) References Cited

U.S. PATENT DOCUMENTS 7,761,627 B2     7/2010 Christison et al.
8,908,580 B2 *  12/2014 Shen ..................... H04W 36/14
                                                     370/310

(Continued)

FOREIGN PATENT DOCUMENTS

WO    WO 2011085205    7/2011
WO    WO 2015026179    2/2015

OTHER PUBLICATIONS

PCT/ISA/210 Search Report issued on PCT/KR2016/012878 (pp. 4).
PCT/ISA/237 Written Opinion issued on PCT/KR2016/012878 (pp. 8).

*Primary Examiner* — Henry Tsai
*Assistant Examiner* — Juanito Borromeo
(74) *Attorney, Agent, or Firm* — The Farrell Law Firm, P.C.

(57) ABSTRACT

Embodiments herein provide a method and an apparatus of maintaining continuity of an on-going session over a wireless interface and a wired interface. The method includes identifying, by a media agnostic universal serial bus (MA-USB) layer, the on-going session between a USB host and a USB device over the wireless interface, detecting, by an application service platform (ASP) layer, an event corresponding to an interruption of the on-going session in the wireless interface, and concurrently continuing, by the ASP layer, the on-going session over a wired interface between the USB host and the USB device in response to the detected event. Wherein session continuity parameters are exchanged between the USB host and the USB device during one of an (Continued)

initial connection over the wireless interface and while initiating connection over the wired interface.

19 Claims, 11 Drawing Sheets

(56) References Cited

U.S. PATENT DOCUMENTS

| | | | |
|---|---|---|---|
| 9,037,763 B2 * | 5/2015 | Huang | G06F 13/385 710/63 |
| 2005/0096086 A1 | 5/2005 | Singamsetty | |
| 2005/0170889 A1 * | 8/2005 | Lum | A63F 13/06 463/39 |
| 2008/0162742 A1 | 7/2008 | Kong et al. | |

* cited by examiner

METHOD AND APPARATUS FOR MAINTAINING CONTINUITY OF ON-GOING SESSION OVER WIRED OR WIRELESS INTERFACE

PRIORITY

This application is a U.S. National Phase Entry of PCT International Application No. PCT/KR2016/012878, which was filed on Nov. 9, 2016 and claims priority to Indian Patent Applications No. 6063/CHE/2015 (PS) and 6063/CHE/2015 (CS), which were filed in the Indian Intellectual Property Office on Nov. 9, 2015 and Nov. 8, 2016, respectively, the entire disclosure of each is incorporated herein by reference.

BACKGROUND

1. Field

The present disclosure relates to universal serial bus (USB) session management and more particularly to a method and system for maintaining continuity of an on-going session over wired or wireless interface.

2. Description of the Related Art

Communication devices and other computing devices (for example, personal computers, mobile telephones, electronic handheld devices, gaming consoles and so on) communicate with a variety of periphery devices using a communication standard. One such communication standard includes a universal serial bus (USB) connection. Some examples of peripheral devices that use a USB connection include keyboards, digital cameras, printers, personal media players, mass storage devices such as flash drives, network adapters, and external hard drives. For many of those devices, USB has become a very common communication standard that facilitates peripheral device connection.

USB devices generally operate using a standard protocol or interface, such as the interface set by a group of companies that developed a USB specification. A USB device communicates with a USB host (for example, personal computers) utilizing an operating system without the need to install additional drivers onto the USB host.

The USB device can connect to the USB host either through a wired connection or through a wireless connection. The USB device can connects to the USB host wirelessly through communication which include relatively short-range communication, similar to Wi-Fi, Bluetooth, or the like.

The wireless serial bus (WSB) is a Protocol Abstraction Layer (PAL) entity for running USB over Wi-Fi and handles the Wi-Fi related aspects of creating the USB connection such as discovery of USB devices managing the power and management of the connection. The WSB standard is being developed to support USB over Wi-Fi.

Currently neither the WSB standard nor any platform has defined the mechanism which allows the USB connection to continue across a wireless interface and a wired interface. During the interface or medium change, the USB connection is terminated and re-started. In case, when the USB connection is established between the USB host and the USB device over the wireless interface and if the wireless interface is changed to the wired interface by the user, then the USB connection between the USB host and the USB device is terminated and the USB connection is restarted over the wired interface.

In case, when the USB connection is established between the USB host and the USB device over the wired interface and if the wired interface is changed to the wireless interface by the user, then the USB connection between the USB host and the USB device is terminated and the USB connection is restarted over the wireless interface. This has adverse effect to user experience and in many cases user has to manually start the service or an application session.

The above information is presented as background information only to help the reader to understand the present disclosure. Applicants have made no determination and make no assertion as to whether any of the above might be applicable as Prior Art with regard to the present application.

SUMMARY

The principal object of the embodiments herein is to provide a method and an apparatus for maintaining continuity of an on-going session over a wireless interface.

Another object of the embodiments herein is to provide a method and an apparatus for maintaining continuity of an on-going session over a wired interface.

Another object of the embodiments herein is to provide a method and an apparatus for optimizing a USB session management across the wired interface and the wireless interface.

Accordingly the embodiments herein provide a method of maintaining continuity of an on-going session over a wireless interface. The method includes identifying the on-going session between a USB host and a USB device over the wireless interface. The method includes exchanging session continuity parameters between the USB host and the USB device. Further, the method includes detecting an event corresponding to an interruption of the on-going session in the wireless interface. Furthermore, the method includes concurrently continuing the on-going session over a wired interface between the USB host and the USB device in response to the detected event. The session continuity parameters are exchanged between the USB host and the USB device over the wireless interface during an initial connection or the session continuity parameters are exchanged between the USB host and the USB device while initiating the connection over the wired interface.

In an embodiment, concurrently continuing the on-going session over the wired interface includes fetching context associated with the on-going session over the wireless interface. Further, the method includes assigning the context to the wired interface to continue the on-going session between the USB host and the USB device over the wired interface.

In an embodiment, the session continuity parameters include a role definition, a port notification, a service identifier and a request to persist the on-going session.

In an embodiment, the context corresponds to an address of the USB device, and USB enumerated information of the USB device.

In an embodiment, the MA-USB layer and the ASP layer resides in the USB host and the USB device.

Accordingly the embodiments herein provide a method of maintaining continuity of an on-going session over a wired interface. The method includes identifying the on-going session between a USB host and a USB device over the wired interface. The method includes exchanging service continuity parameters over wired interface during enumeration. Further, the method includes detecting an event corresponding to an interruption of the on-going session in the wired interface. Furthermore, the method includes concurrently continuing, by the ASP layer, the on-going session over a wireless interface in response to the detected event.

In an embodiment, concurrently continuing the on-going session over the wireless interface includes discovering, by the ASP layer, the USB device based on service continuity parameters exchanged between the USB host and the USB device. Further, the method includes establishing connection with the discovered USB device over wireless interface.

The method includes determining whether to continue the on-going session between the USB host and the USB device. Further, the method includes reinitiating the on-going session, in response to determining that the session is to be continued.

The method includes initiating a session between the USB host and the USB device in response to determining that the on-going session is to be terminated.

Further, the method includes determining that a predetermined time interval to continue the on-going session between the USB host and the USB device reaches a threshold. Furthermore, the method includes terminating the on-going session in response to determining that the time interval to continue the on-going session reached the perdetermined threshold.

Accordingly the embodiments herein provide a system for maintaining continuity of an on-going session over a wireless interface, the system configured to identify the on-going session between the USB host and a USB device over the wireless interface. The system is configured to exchange, by the MA-USB layer, session continuity parameters between the USB host and the USB device. Further, the system is configured to detect in the USB host and the USB device, an event corresponding to an interruption of the on-going session in the wireless interface. Furthermore, the system is configured to concurrently continue the on-going session over a wired interface between the USB host and the USB device in response to the detected event, wherein session continuity parameters are exchanged between the USB host and the USB device over the wireless interface during an initial connection or the session continuity parameters are exchanged between the USB host and the USB device while initiating connection over the wired interface.

Accordingly the embodiments herein provide a system for maintaining continuity of an on-going session over a wired interface, the system configured to identify the on-going session between the USB host and the USB device over the wired interface. The system is configured to exchange service continuity parameters over wired interface during enumeration. Further, the system is configured to detect an event corresponding to an interruption of the on-going session in the wired interface. Furthermore, the system is configured to concurrently continue the on-going session over a wireless interface between the USB host and the USB device in response to the detected event.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE ACCOMPANYING DRAWINGS

This invention is illustrated in the accompanying drawings, throughout which like reference letters indicate corresponding parts in the various figures. The embodiments herein will be better understood from the following description with reference to the drawings, in which.

Figure 8:
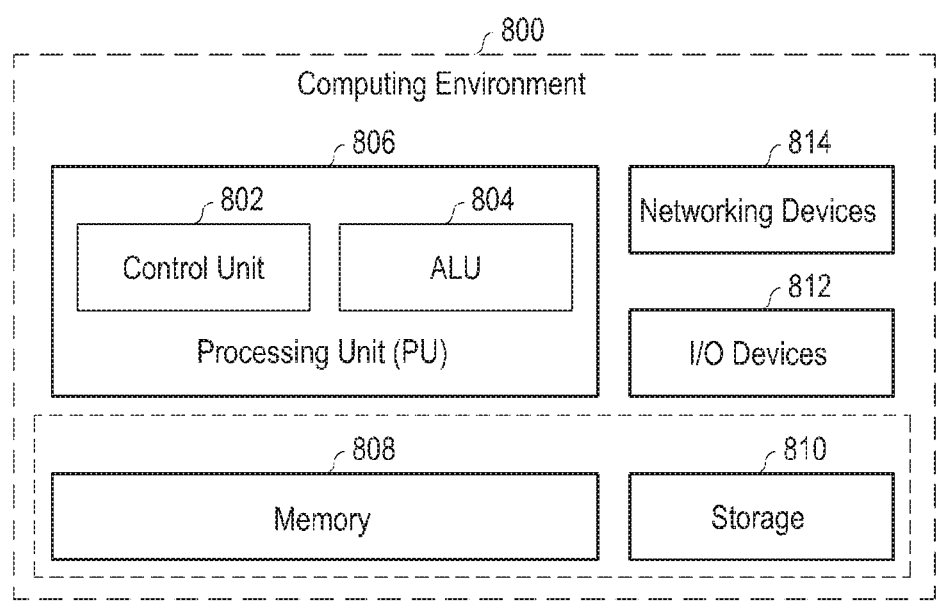

FIGS. 7A to 7D illustrate example scenarios of maintaining continuity of the on-going session over the wireless interface, according to an embodiment as disclosed herein; and FIG. 8 illustrates a computing environment implementing the method and system for maintaining continuity of the on-going session across the wired interface and the wireless interface, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide a method of maintaining continuity of an on-going session over a wireless interface. The method includes identifying the on-going session between a universal serial bus (USB) host and a USB device over the wireless interface. Further, the method includes detecting an event corresponding to an interruption of the on-going session in the wireless interface. Furthermore, the method includes concurrently continuing the on-going session over a wired interface between the USB host and the USB device in response to the detected event.

In an embodiment, the MA-USB layers 100a and 101a exchange the session continuity parameters between the USB host 100 and the USB device 101 during an initial connection over the wireless interface.

In an embodiment, the session continuity parameters include the role definition and the port notification or the like. The role definition denotes the role as the USB host 100 or the USB device 101 and the port notification includes a port number.

In an embodiment, the MA-USB layers 100a and 101a exchange the session continuity parameters between the USB host 100 and the USB device 101 while initiating the connection over the wired interface.

The embodiments herein provide a method of maintaining continuity of an on-going session over a wired interface. The method includes identifying the on-going session between a USB host and a USB device over the wired interface. The method includes exchanging service continuity parameters over wired interface during enumeration. Further, the method includes detecting an event corresponding to an interruption of the on-going session in the wired interface. Furthermore, the method includes concurrently continuing the on-going session over a wireless interface in response to the detected event.

Unlike the conventional systems, the proposed method and system allows the on-going session to continue when an underlying interface is changed, i.e., from the wired interface to the wireless interface or from the wireless interface to wired interface. The proposed method and system supports the on-going session continuity, even if a user disconnects USB device from USB connection with USB host. The proposed method allows session continuity without any user intervention. The proposed method performs a smooth transition from the wired interface to the wireless interface and from the wireless interface to the wired interface.

Referring now to the drawing, and more particularly to FIGS. 1 through 8, there are shown preferred embodiments.

Figure 1:
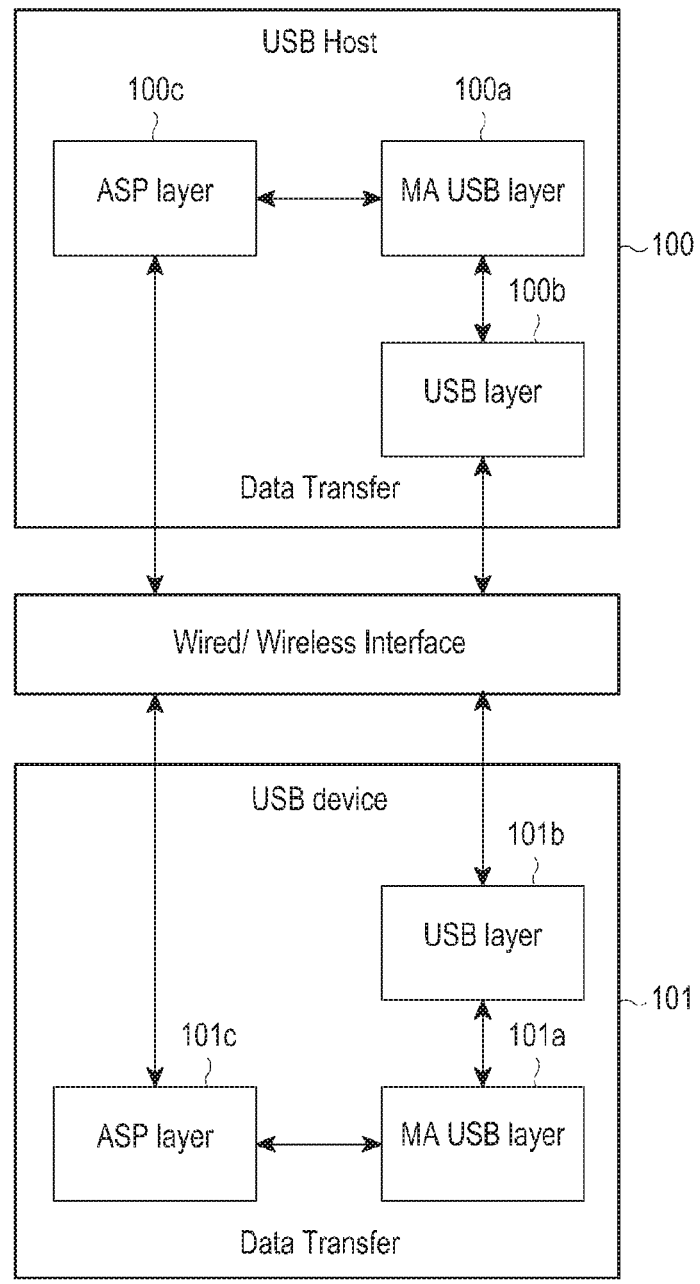
FIG. 1 illustrates various layers in a universal serial bus (USB) host and a USB device for maintaining continuity of an on-going session across a wired interface and a wireless interface, according to an embodiment as disclosed herein.

FIG. 1 illustrates various layers in a universal serial bus (USB) host 100 and a USB device 101 for maintaining continuity of the on-going session across a wired interface and a wireless interface, according to an embodiment as disclosed herein. The USB specification defines architecture and a set of protocols to perform discovery of the USB device 101, connection setup between the USB host 100 and the USB device 101, and the method of utilizing the Media Agnostic USB (MA USB) protocol for USB data transfers.

As depicted in the FIG. 1, the USB host 100 comprises a MA-USB layer unit 100a, a USB layer unit 100b and an ASP layer unit 100c. The USB client 101 comprises a MA-USB layer unit 101a, a USB layer unit 101b and an ASP layer unit 101c.

The USB layers 100b and 101b (which is residing in the USB host 100 and the USB client 101) performs device discovery i.e., the USB layer 100b in the USB host 100 discovers the USB device 101 and the USB layer 101b in the USB device 101 discovers the USB host when the USB device 101 and the USB host 100 are connected over a wired interface.

In an embodiment, the ASP layers 100c and 101c perform device discovery i.e., the ASP layer 100c discovers the USB device 101 and the ASP layer 101c discovers the USB host 100.

After the discovery, the USB host and the USB device can connect to each other by setting up an ASP session between the ASP layers 100c and 101c. After the connection setup, the MA USB layer 100a and 101a (which is present on the USB host 100 and the USB device 101) is used to perform the USB enumeration and USB data transfers over the wired interface or a wireless interface as shown in the FIG. 1.

In an embodiment, when there is an on-going session between the USB host 100 and the USB device 101 over the wireless interface, the MA-USB layers 101a and 101b to identify the on-going session between the USB host 100 and the USB device 101.

The ASP layers 100c and 101c detect the event corresponding to the interruption of the on-going session in the wireless interface. When the event is detected, the MA USB layers 100a and 101a, fetches the context.

In an embodiment, the context includes USB device's address, and USB enumerated information or the like.

Further, the MA USB layers 100a and 101a assigns the context automatically to the wired interface. Further, the on-going session continues over the wired interface and the USB host 100 and the USB device 101 terminate the wireless interface(s).

In an embodiment, the MA-USB layers 100a and 101a exchange the session continuity parameters between the USB host 100 and the USB device 101 during an initial connection over the wireless interface.

In an embodiment, the session continuity parameters include the role definition and the port notification or the like. The role definition denotes the role as the USB host 100 or the USB device 101 and the port notification includes a port number.

In an embodiment, the MA-USB layers 100a and 101a exchange the session continuity parameters between the USB host 100 and the USB device 101 during an initial connection over the wired interface.

In an embodiment, when there is an on-going session between the USB host 100 and the USB device 101 over the wired interface, the MA-USB layers 101a and 101b to identify the on-going session between the USB host 100 and the USB device 101. Further, the MA-USB layers 100a and 101a exchange the session continuity parameters over the wired interface during enumeration.

In an embodiment, the service continuity parameters include Wi-Fi medium access control (MAC) address, session ID or the like. The ASP layers 100c and 101c detect the event corresponding to the interruption of the on-going session in the wireless interface. When the event is detected, the ASP layers 100c and 101c determine whether a predetermined time interval to continue the on-going session has reached a threshold. In an example, the threshold can be 10 milliseconds. In case, ASP layers 100c and 101c determines that the time interval to continue the on-going session has not reached the threshold, then the on-going session is continued over the wireless interface.

In case, ASP layers 100c and 101c determines that the time interval to continue the on-going session has reached the threshold, then the ASP layers 100c and 101c terminate the on-going session.

Although the FIG. 1 includes various layers in the USB host 100 and the USB device 101, it should be understood to a person of ordinary skilled in the art that these layers can be easily integrated to form a single layer that performs various actions as mentioned above.

Figure 2:
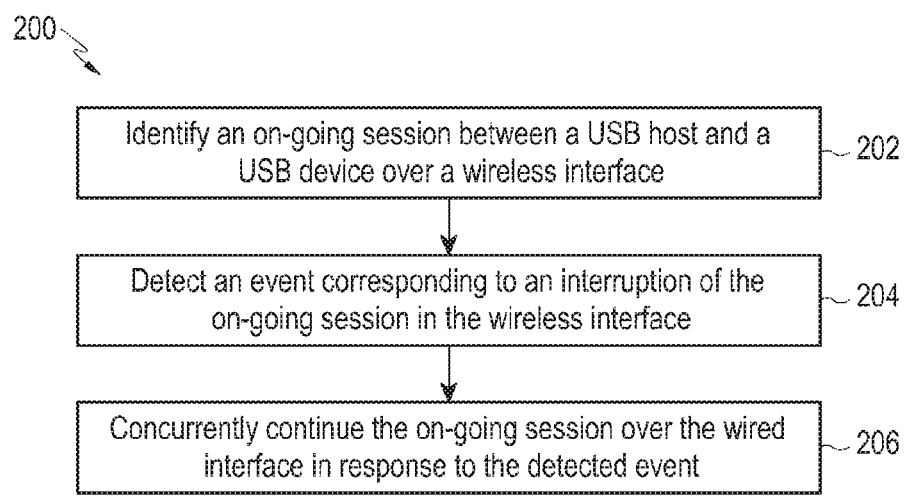
FIG. 2 is a flow chart illustrating a method for maintaining continuity of an on-going session over the wireless interface, according to an embodiment as disclosed herein.

FIG. 2 is a flow chart 200 illustrating a method for maintaining continuity of an on-going session over a wireless interface, according to an embodiment as disclosed herein.

Referring to the FIG. 2, at step 202, the method includes identifying the on-going session between the USB host 100 and the USB device 101 over the wireless interface. The method allows the MA-USB layers 101a and 101b to identify the on-going session between the USB host 100 and the USB device 101 over the wireless interface. When the USB device 101 (i.e., a mobile phone) is connected to the USB host 100 (i.e., a PC) wirelessly, the USB host 100 detects the USB connection and initiates the USB session automatically. The on-going USB session is identified and controlled by the MA-USB layers 100a and 101a in the USB host 100 and the USB device 101.

At step 204, the method includes detecting the event corresponding to the interruption of the on-going session in the wireless interface. The method allows the ASP layers 100c and 101c to detect the event corresponding to the interruption of the on-going session in the wireless interface. In an example, the event indicates a physical connection i.e., when the user connects the phone to the PC. The on-going session is interrupted due to the detection of event in the wireless interface.

At step 206, the method includes concurrently continuing the on-going session over the wired interface in response to the detected event. The method allows the ASP layers 100c and 101c to concurrently continue the on-going session over the wired interface between the USB host 100 and the USB device 101 in response to the detected event. The continuity of the on-going session over the wireless interface is as described herein. With the on-going session over the wireless interface, the MA USB layers 100a and 101a, fetches the context In an embodiment, the context includes USB device's address, USB enumerated information or the like. Further, the MA-USB layers 100a and 101a assigns the context automatically to the wired interface. Thus, the whole set of USB initialization process is avoided by fetching and assigning the context of the on-going session over the wireless interface. Further, the on-going session continues over the wired interface and the USB host 100 and the USB device 101 can terminate the wireless interfaces. With the above described method, the wired interface initialization will be faster and service is not interrupted.

In an embodiment, the method allows the MA-USB layers 100a and 101a to exchange the session continuity parameters between the USB host 100 and the USB device 101. During the on-going session, the MA-USB layers 100a and 101a exchange the session continuity parameters which include the role definition and the port notification. The role definition denotes the role as the USB host 100 or the USB device 101 and the port notification includes a port number, a service identifier, and also a request to persist the session in the event of the change in the underlying connectivity.

In an embodiment, the service continuity parameters are exchanged during an initial connection between the USB host 100 and the USB device 101 over the wireless interface.

In an embodiment, service continuity parameters are exchanged during an initial connection between the USB host 100 and the USB device 101 over the wired interface.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3A:
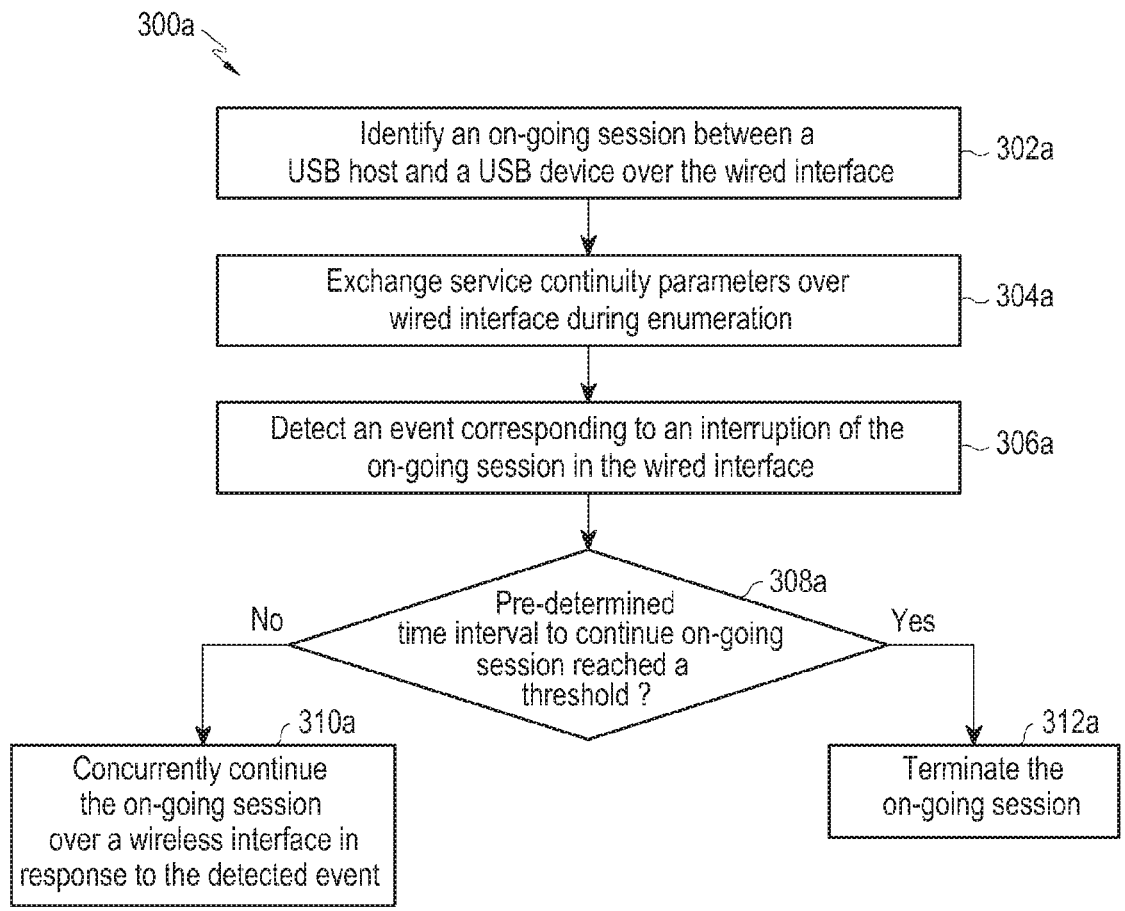
FIG. 3A is a flow chart illustrating a method for maintaining continuity of an on-going session over the wired interface, according to an embodiment as disclosed herein.

FIG. 3A is a flow chart 300a illustrating a method for maintaining continuity of an on-going session over a wired interface, according to an embodiment as disclosed herein.

Referring to the FIG. 3A, at step 302a, the method includes identifying the on-going session between the USB host 100 and a USB device 101 over the wired interface. The method allows the MA-USB layers 101a and 101b to identify the on-going session between the USB host 100 and the USB device 101 over the wireless interface. When the user connects the USB device 101 (i.e., a mobile phone) to the USB host 100 (i.e., a PC), the USB host 100 detects the USB connection and initiates the USB session automatically. The on-going USB session is identified and controlled by the MA-USB layers 100a and 101a in the USB host 100 and the USB device 101.

At step 304a, the method includes exchanging service continuity parameters over wired interface during enumeration. The method allows the MA-USB layers 100a and 101a to exchange the session continuity parameters between the USB host 100 and the USB device 101. In the on-going USB session, the MA-USB layers 100a and 101a exchange (504) the service continuity parameters over the wired interface during enumeration. In an example, the service continuity parameters include Wi-Fi MAC address, session ID and so on, a service identifier and a request for persisting the session in event of underlying connectivity changes.

In an embodiment, the service continuity parameters are exchanged during initial connection between the USB host 100 and the USB device 101.

At step 306a, the method includes detecting the event corresponding to an interruption of the on-going session in the wired interface. The method allows the ASP layers 100c and 101c to detect the event corresponding to the interruption of the on-going session in the wireless interface. In an example, the event includes removing the mobile phone from the PC. During the on-going session, if the user removes the mobile phone from the PC (with an intention to perform a call or to attend a call), the event is detected. When the user removes the mobile phone from the PC, the on-going session is interrupted.

At step 308a, the method includes determining that a pre-determined time interval to continue the on-going session reached a threshold. The method allows the ASP layers 100c and 101c to determine that the time interval to continue the on-going session reached the threshold. In an example, the threshold can be 10 milliseconds. In case, it is determined that the time interval to continue the on-going session has not reached the threshold, then at step 310a, the method includes concurrently continuing the on-going session over the wireless interface. If it is determined that the pre-determined time interval to continue the on-going session has not reached 10 milliseconds, then the ASP layer 100c in the USB host 100 discovers the USB device 101 based on the service continuity parameters exchanged between the USB host 100 and the USB device 101. Further, the on-going session is continued over the wireless interface by establishing the connection with the discovered USB device 101. Hence, with a specified timeout or time interval, the PC and the mobile phones cans for identifying each other with the known information such as the Wi-Fi MAC address, the session ID and the other parameters exchanged during enumeration. Once the PC and mobile phone discovers each other, the PC and mobile phone connect with each other and the on-going session that has been interrupted by wired disconnection is continued.

In case, it is determined that the time interval to continue the on-going session has reached the threshold, then at step 312a, the method includes terminating the on-going session. The method allows the ASP layers 100c and 101c to terminate the on-going session. If it is determined that the time interval to continue the on-going session has reached 10 milliseconds, then the ASP layer 100c and 101c terminates the on-going session.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3B:
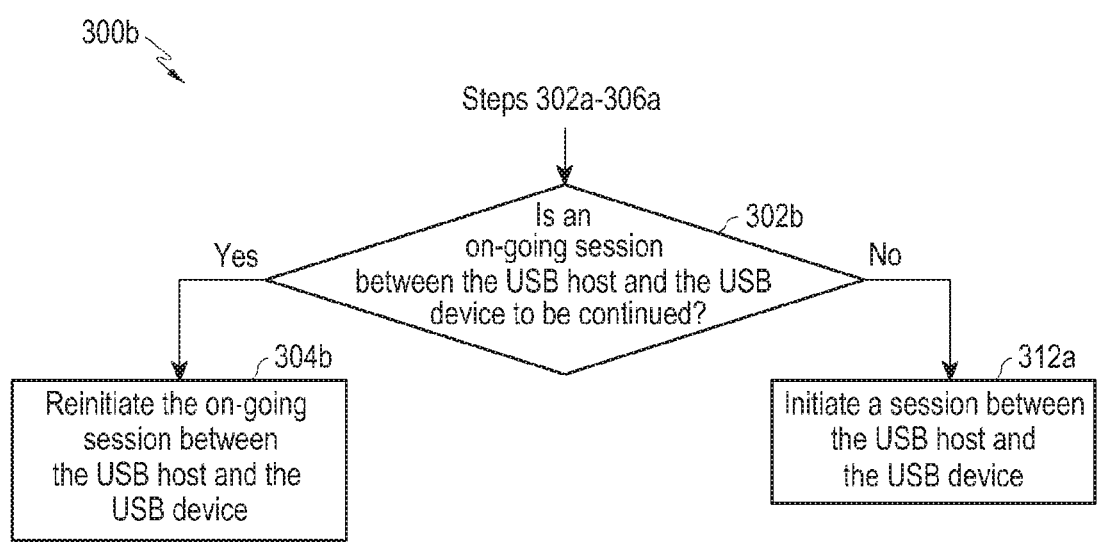
FIG. 3B is a flow chart illustrating a method for reinitiating the on-going session between the USB host and the USB device over the wired interface, according to an embodiment as disclosed herein.

FIG. 3B is a flow chart 300b illustrating a method for reinitiating the on-going session between the USB host and the USB device over the wired interface, according to an embodiment as disclosed herein. Initially the steps 302a-308a is performed as described in the FIG. 3A.

Referring to the FIG. 3B, at step 302b, the method includes determining whether to continue the on-going session between the USB host 100 and the USB device 101. The method allows the ASP layers 100c and 101c to determine whether to continue the on-going session between the USB host 100 and the USB device 101. After detection of the event, i.e., when the user removes the mobile phone from the PC, the ASP layers 100c and 101c determine whether to continue the on-going session between the USB host 100 and the USB device 101

In case, it is determined that the on-going session is determined to be continued, at step 304b, the method includes reinitiating the on-going session between the USB host 100 and the USB device 101. The method allows the ASP layers 100c and 101c to reinitiating the on-going session between the USB host 100 and the USB device 101. When the ASP layers 100c and 101c determine to continue the session, the on-going session is reinitiated.

In case, it is determined that the on-going session is determined not to be continued, at step 306b, the method includes initiating a session between the USB host 100 and the USB device 101. The method allows the ASP layers 100c and 101c to initiate the session between the USB host 100 and the USB device 101. When the ASP layers 100c and 101c determine that the on-going session is not to be continued, a new session is initiated between the USB host 100 and the USB device 101.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 4:
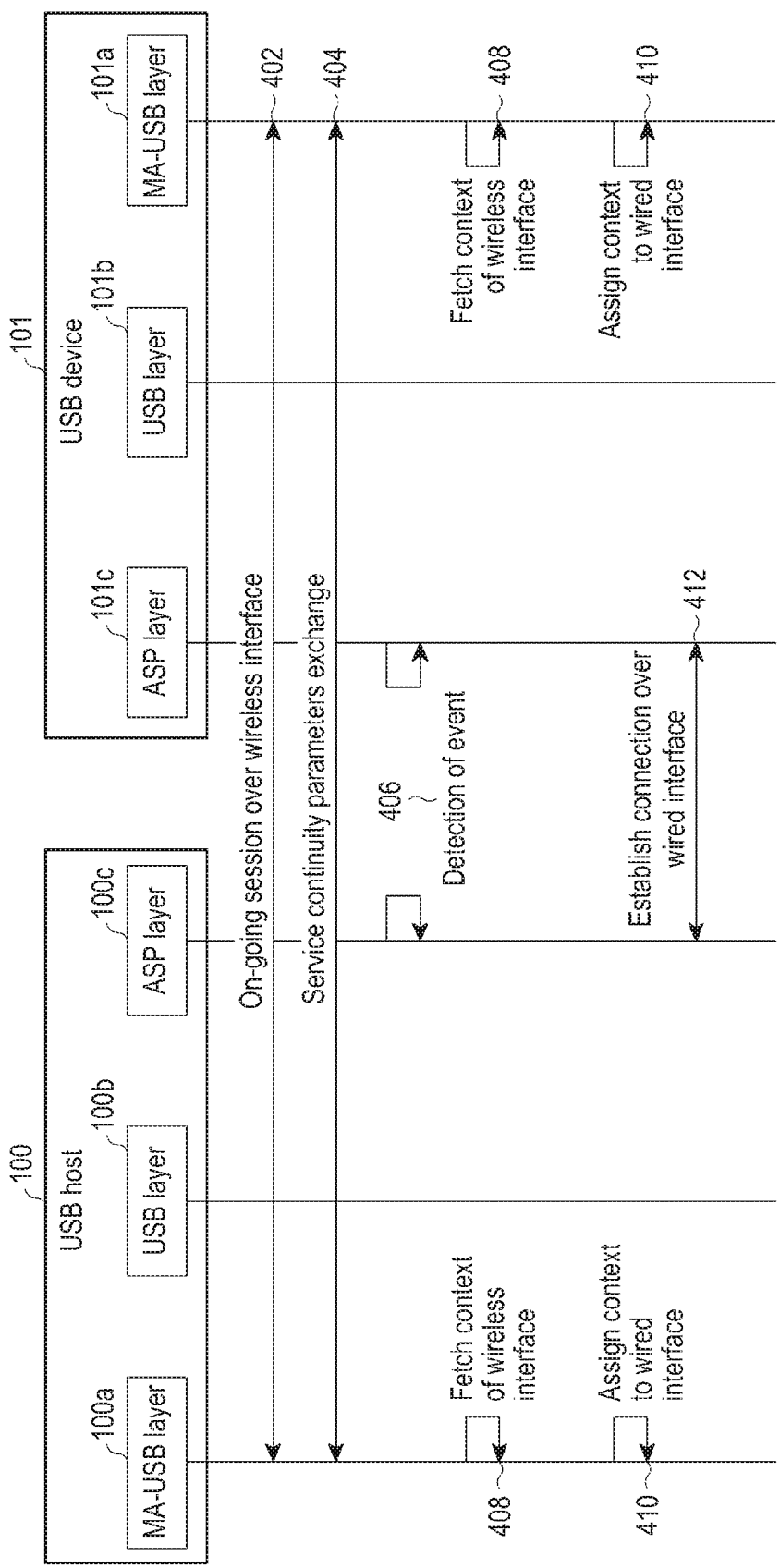
FIG. 4 is a sequence diagram showing various signaling messages for maintaining continuity of the on-going session from the wireless interface to the wired interface.

FIG. 4 is a sequence diagram showing various signaling messages for maintaining continuity of the on-going session from the wireless interface to the wired interface. Initially, the ASP layers 100c and 101c initiate the discovery process to discover the USB device 101 and the USB host 100 respectively. After the discovery, the USB host 100 and the USB device 101 initiates the session. The USB host 100 and the USB device 101 uses Wi-Fi interface to connect with each other.

As depicted in the FIG. 4, the session is on-going (402) between the MA-USB layers 100a and 101a in the USB host 100 and the USB device 101 over the wireless interface. In the on-going session, the MA-USB layers 100a and 101a exchange (404) the service continuity parameters over the wireless interface. The session continuity parameters include the role definition and the port notification. The role definition denotes the role as the USB host 100 or the USB device 101 and the port notification includes a port number.

After exchanging the service continuity parameters during enumeration, the ASP layer 100c and 101c detects (406) the event corresponding to the interruption of the on-going session between the USB host 100 and the USB device 101. The on-going session is temporarily halted upon detection of the event. With the on-going session over the wireless interface, the MA USB layers 100a and 101a fetches (408) the context, i.e., USB device's address, USB enumerated information. Further, the MA USB layers 100a and 101a assigns (410) the context automatically to the wired interface. Thus, the whole set of USB initialization process is avoided by fetching and assigning the context of the on-going session over the wireless interface. The on-going session continues over the wired interface. The ASP layers 100c and 101c establishes (412) the connection over the wired interface as shown in the FIG. 4. Once the wired interface is initiated, the session continues over the wired interface. Although, in the FIG. 4, it is shown that the service continuity parameters are exchanged by the MA-USB layers 100a and 101a over the wireless interface, it should be understood to a person of ordinary skilled in the art that the service continuity parameters are exchanged by the MA-USB layers 100a and 101a during an initial connection over the wired interface.

Figure 5:
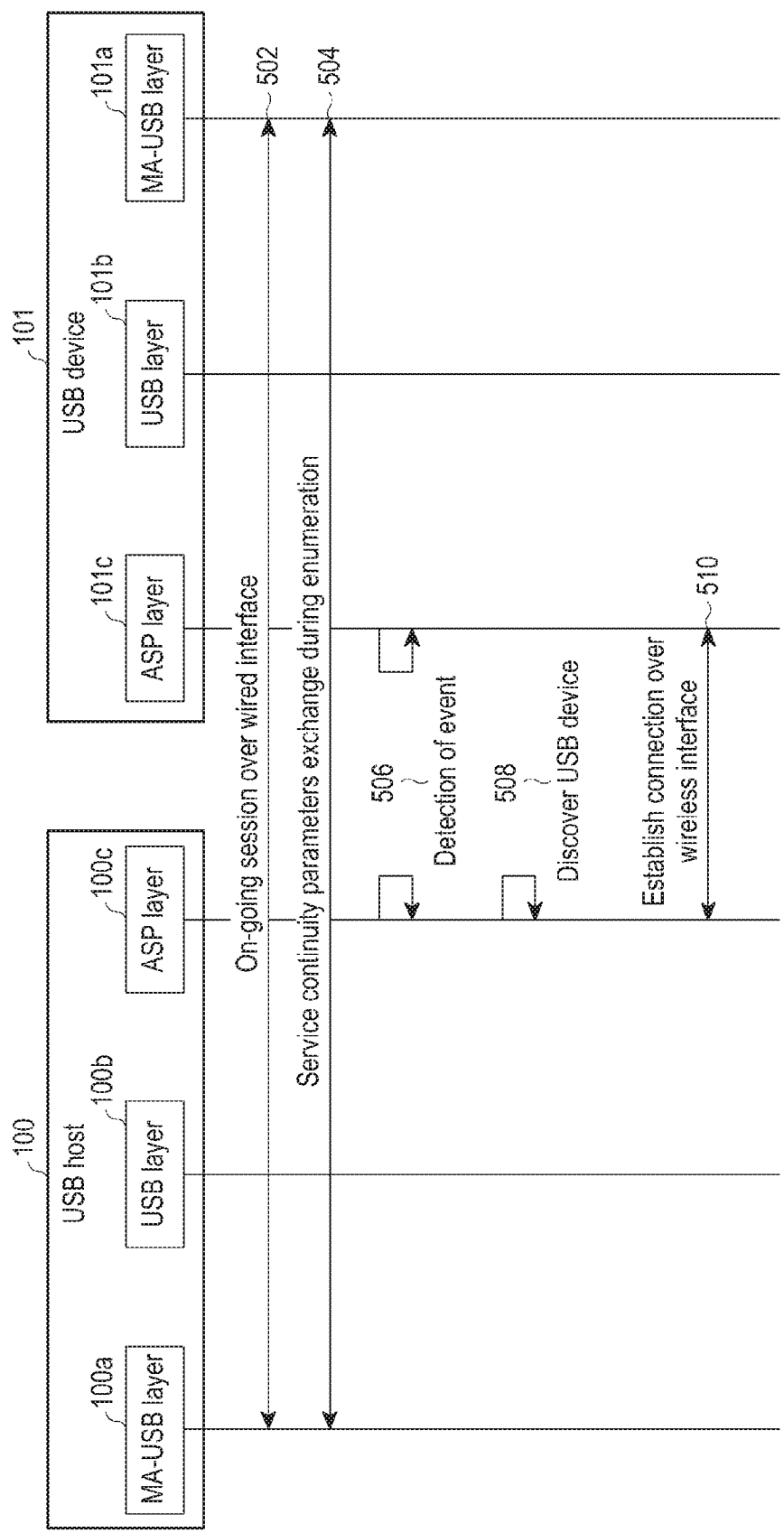
FIG. 5 is a sequence diagram showing various signaling messages for maintaining continuity of the on-going session from the wired interface to the wireless interface, according to an embodiment as disclosed herein.

FIG. 5 is a sequence diagram showing various signaling messages for maintaining continuity of the on-going session from the wired interface to the wireless interface, according to an embodiment as disclosed herein.

As depicted in the FIG. 5, the USB session is on-going (502) between the MA-USB layers 100a and 101a in the USB host 100 and the USB device 101 over the wired interface. In the on-going USB session, the MA-USB layers 100a and 101a exchange (504) the service continuity parameters over the wired interface during enumeration. In an example, the service continuity parameters include Wi-Fi MAC address, session ID and so on. After exchanging the service continuity parameters during enumeration, the ASP layer 100c and 101c detects (506) the event corresponding to the interruption of the on-going session between the USB host 100 and the USB device 101. The on-going session is temporarily halted upon detection of the event. With the service continuity parameters exchanged during the enumeration, the USB host 100 and the USB device 101 knows capability information of each other and the on-going USB session information is maintained. Further, the ASP layer 100c discovers (508) the USB device based on the service continuity parameters exchanged between the USB host 100 and the USB device 101. Further, the ASP layer 100c establishes (510) the connection with the USB device 101 over the wireless interface. Thus, the connection is established between the ASP layer 100c and the ASP layer 101c over the wireless interface and the USB session continues over the wireless interface as shown in the FIG. 5.

FIGS. 6A TO 6D illustrate example scenarios of maintaining continuity of the on-going session over the wired interface, according to an embodiment as disclosed herein.

Figure 6A:
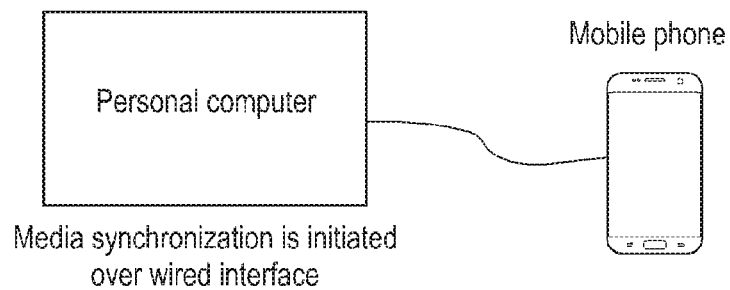
FIGS. 6A to 6D illustrate example scenarios of maintaining continuity of the on-going session over the wired interface, according to an embodiment as disclosed herein.

As depicted in the FIG. 6A, the mobile phone is connected to the personal computer which triggers a USB session between the mobile phone and the personal computer. The media synchronization is initiated between the personal computer and the mobile phone over the wired interface.

Figure 6B:
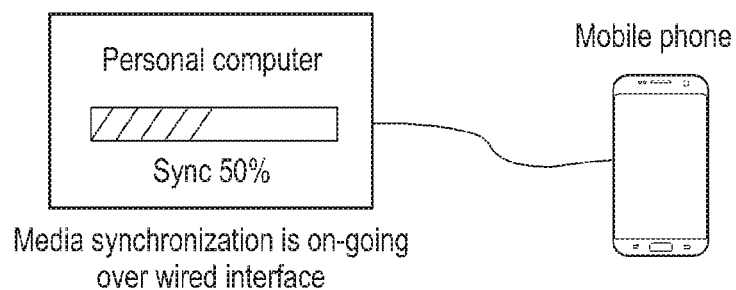
Figure 6C:
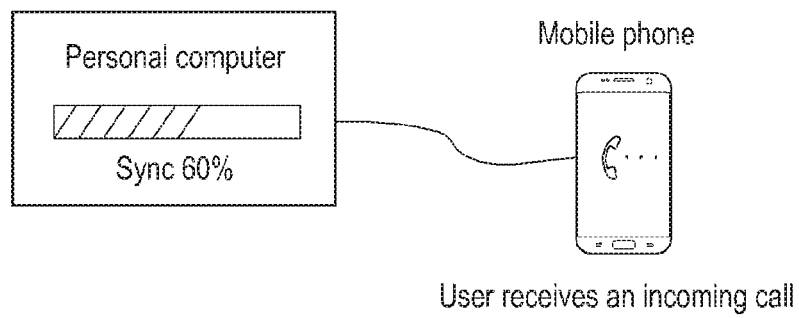
Figure 6D:
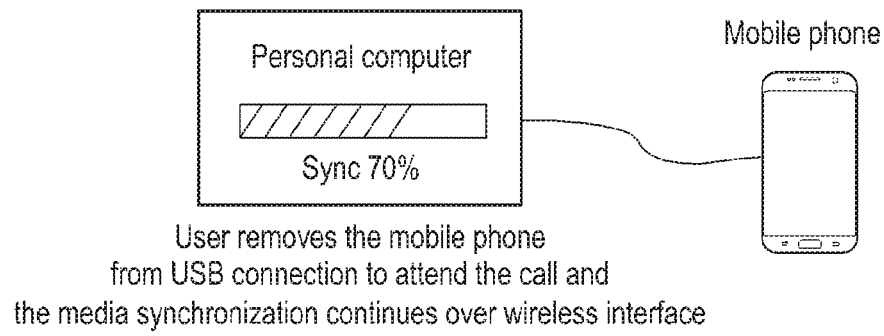
Figure 7A:
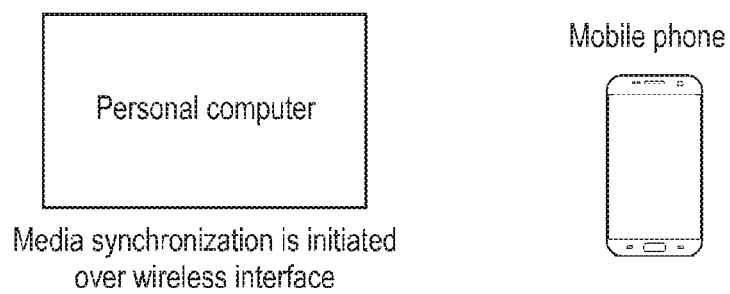
Figure 7B:
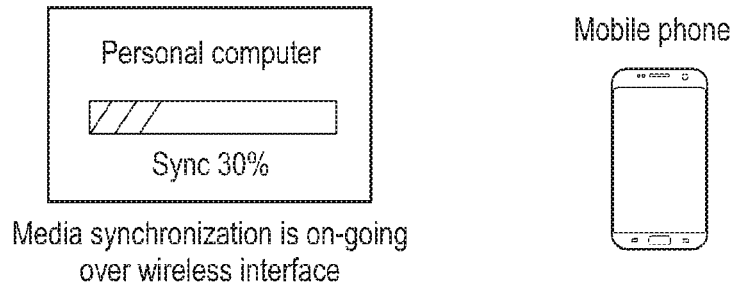
Figure 7C:
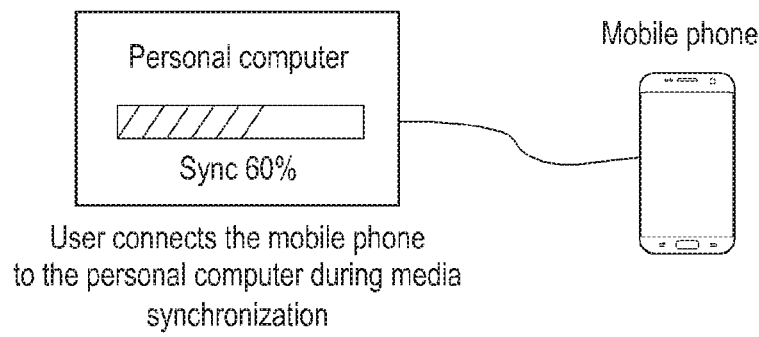
Figure 7D:
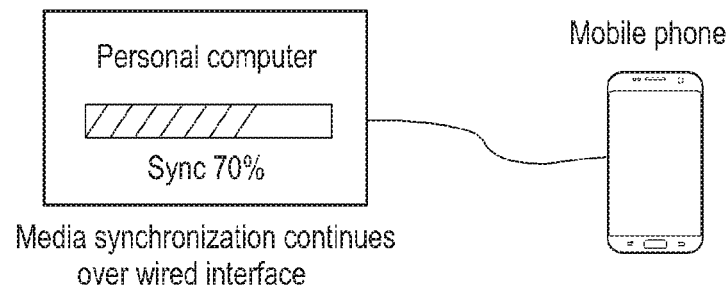

The media synchronization is on-going over the wired interface as shown in the FIG. 6B. When the media synchronization is on-going, the user has an incoming call on the mobile phone as shown in the FIG. 6C. In order to attend the incoming call, the user removes the USB connection of the mobile phone from the personal computer. When the mobile phone's USB connection is removed from the personal computer, the media synchronization continues over the wireless interface as shown in the FIG. 6D.

FIGS. 7A to 7D illustrate example scenarios of maintaining continuity of the on-going session over the wireless interface, according to an embodiment as disclosed herein. As depicted in the FIG. 7A, the media synchronization is initiated between the personal computer and the mobile phone over the wireless interface. The media synchronization is on-going between the personal computer and the mobile phone over the wireless interface as shown in the FIG. 7B. When the media synchronization is on-going, the user connects the mobile phone to the personal computer (i.e., a physical connection) over the wired interface as shown in the FIG. 7C. Further, the media synchronization is continued over the wired interface as shown in the FIG. 7D.

FIG. 8 illustrates a computing environment implementing the method and system for maintaining continuity of the on-going session across the wired interface and the wireless interface, according to an embodiment as disclosed herein.

As depicted in the FIG. 8, the computing environment 800 comprises at least one processing unit 806 that is equipped with a control unit 802 and an Arithmetic Logic Unit (ALU) 804, a memory 808, a storage unit 810, plurality of networking devices 814 and a plurality of Input output (I/O) devices 812. The processing unit 806 is responsible for processing the instructions of the algorithm. The processing unit 806 receives commands from the control unit 802 in order to perform its processing. Further, any logical and arithmetic operations involved in the execution of the instructions are computed with the help of the ALU 804.

The overall computing environment 800 can be composed of multiple homogeneous and/or heterogeneous cores, multiple CPUs of different kinds, special media and other accelerators. The processing unit 806 is responsible for processing the instructions of the algorithm. Further, the plurality of processing units 806 may be located on a single chip or over multiple chips.

The algorithm comprising of instructions and codes required for the implementation are stored in either the memory unit 808 or the storage 810 or both. At the time of execution, the instructions may be fetched from the corresponding memory 808 or storage 810, and executed by the processing unit 806.

In case of any hardware implementations various networking devices 814 or external I/O devices 812 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 8d include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method of maintaining continuity of an on-going session over a wireless interface, the method comprising:
   identifying, by a media agnostic universal serial bus (MA-USB) layer, the on-going session between a USB host and a USB device over the wireless interface;
   detecting, by an application service platform (ASP) layer, an event corresponding to an interruption of the on-going session in the wireless interface;
   after the event is detected, determining, by the ASP layer, that a pre-determined time interval to continue the on-going session between the USB host and the USB device reaches a threshold;
   in response to determining that the pre-determined time interval to continue the on-going session is reached the threshold, terminating, by the ASP layer, the on-going session; and
   in response to determining that the pre-determined time interval to continue the on-going session is not reached the threshold, continuing, by the ASP layer, the on-going session over a wired interface between the USB host and the USB device in response to the detected event, wherein session continuity parameters are exchanged between the USB host and the USB device during one of: an initial connection over the wireless interface and initiating connection over the wired interface.

2. The method of claim 1, wherein concurrently continuing the on-going session over the wired interface includes:
   fetching, by the MA-USB layer, context associated with the on-going session over the wireless interface;
   assigning, by the MA-USB layer, the context to the wired interface to continue the on-going session between the USB host and the USB device over the wired interface.

3. The method of claim 1, wherein the session continuity parameters includes a role definition, a port notification, a service identifier and a request to persist the on-going session.

4. The method of claim 2, wherein the context corresponds to an address of the USB device, and an USB enumerated information of the USB device.

5. The method of claim 1, wherein the MA-USB layer and the ASP layer resides in one of the USB host and the USB device.

6. A method of maintaining continuity of an on-going session over a wired interface, the method comprising:
   identifying, by a media agnostic universal serial bus (MA-USB) layer, the on-going session between a USB host and a USB device over the wired interface;
   exchanging, by the MA-USB layer, service continuity parameters over wired interface during enumeration;
   detecting, by an application service platform (ASP) layer, an event corresponding to an interruption of the on-going session in the wired interface;
   after the event is detected, determining, by the ASP layer, that a pre-determined time interval to continue the on-going session between the USB host and the USB device reaches a threshold;

in response to determining that the pre-determined time interval to continue the on-going session is reached the threshold, terminating, by the ASP layer, the on-going session; and in response to determining that the pre-determined time interval to continue the on-going session is not reached the threshold, continuing, by the ASP layer, the on-going session over a wireless interface in response to the detected event.

7. The method of claim 6, wherein concurrently continuing the on-going session over the wireless interface comprises:

discovering, by the ASP layer, the USB device based on service continuity parameters exchanged between the USB host and the USB device; and establishing connection, by the ASP layer, with the discovered USB device over wireless interface.

8. The method of claim 6, wherein the method further comprises:

determining, by the ASP layer, whether to continue the on-going session between the USB host and the USB device; and reinitiating, by the ASP layer, the on-going session, in response to determining that the session is to be continued.

9. The method of claim 8, wherein the method further comprises initiating, by the ASP layer, a session between the USB host and the USB device in response to determining that the on-going session is to be terminated.

10. An apparatus for maintaining continuity of an on-going session over a wireless interface, the apparatus comprising:

a media agnostic universal serial bus (MA-USB) layer and an application service platform (ASP) layer and configured to:

identify, by the MA-USB layer, the on-going session between a USB host and a USB device over the wireless interface;

detect, by the ASP layer, an event corresponding to an interruption of the on-going session in the wireless interface;

after the event is detected, determine, by the ASP layer, that a pre-determined time interval to continue the on-going session between the USB host and the USB device reaches a threshold;

in response to determining that the pre-determined time interval to continue the on-going session is reached the threshold, terminate, by the ASP layer, the on-going session; and in response to determining that the pre-determined time interval to continue the on-going session is not reached the threshold, continue, by the ASP layer, the on-going session over a wired interface between the USB host and the USB device in response to the detected event, wherein session continuity parameters are exchanged between the USB host and the USB device by the MA-USB layer during one of: an initial connection over the wireless interface and initiating connection over the wired interface.

11. An apparatus for maintaining continuity of an on-going session over a wired interface, the apparatus comprising:

a media agnostic universal serial bus (MA-USB) layer and an application service platform (ASP) layer and configured to:

identify, by the MA-USB layer, the on-going session between a USB host and a USB device over the wired interface;

exchange, by the MA-USB layer, service continuity parameters over wired interface during enumeration;

detect, by the ASP layer, an event corresponding to an interruption of the on-going session in the wired interface;

after the event is detected, determine, by the ASP layer, that a pre-determined time interval to continue the on-going session between the USB host and the USB device reaches a threshold;

in response to determining that the pre-determined time interval to continue the on-going session is reached the threshold, terminate, by the ASP layer, the on-going session; and in response to determining that the pre-determined time interval to continue the on-going session is not reached the threshold, continue, by the ASP layer, the on-going session over a wireless interface between the USB host and the USB device in response to the detected event.

12. The apparatus of claim 10, wherein when the ASP layer concurrently continues the on-going session over a wired interface, the MA-USB layer is further configured to:

fetch context associated with the on-going session over the wireless interface;

assign the context to the wired interface to continue the on-going session between the USB host and the USB device over the wired interface.

13. The apparatus of claim 10, wherein the session continuity parameters includes a role definition, a port notification, a service identifier and a request to persist the on-going session.

14. The apparatus of claim 12, wherein the context corresponds to an address of the USB device, and an USB enumerated information of the USB device.

15. The apparatus of claim 10, wherein the MA-USB layer and the ASP layer resides in one of the USB host and the USB device.

16. The apparatus of claim 11, wherein when the ASP layer concurrently continues the on-going session over a wireless interface, the ASP layer is further configured to:

discover the USB device based on service continuity parameters exchanged between the USB host and the USB device; and establish connection with the discovered USB device over wireless interface.

17. The apparatus of claim 11, wherein when the ASP layer concurrently continues the on-going session over a wireless interface, the ASP layer is further configured to:

determine whether to continue the on-going session between the USB host and the USB device; and reinitiate the on-going session, in response to determining that the session is to be continued.

18. The apparatus of claim 16, wherein the ASP layer is further configured to:

initiate, by the ASP layer, a session between the USB host and the USB device in response to determining that the on-going session is to be terminated.

19. The apparatus of claim 11, wherein the ASP layer is further configured to:

determine that a pre-determined time interval to continue the on-going session between the USB host and the USB device reaches a threshold; and
terminate the on-going session in response to determining that the pre-determined time interval to continue the on-going session reached the threshold.

\* \* \* \* \*